UNITED STATES PATENT OFFICE.

HEINRICH NERESHEIMER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE DYES AND PROCESS OF MAKING THEM.

1,207,981.     Specification of Letters Patent.     Patented Dec. 12, 1916.

No Drawing.     Application filed October 29, 1914. Serial No. 869,166.

*To all whom it may concern:*

Be it known that I, HEINRICH NERESHEIMER, Ph. D., chemist, subject of the Queen of the Netherlands, residing at Ludwigshafen-on-the-Rhine, Germany, have invented new and useful Improvements in Anthraquinone Dyes and Processes of Making Them, of which the following is a specification.

I have discovered new anthraquinone dyes which are 4-amino-3-sulfo-2.1-anthraquinone acridones and possess a constitution corresponding to the general formula:—

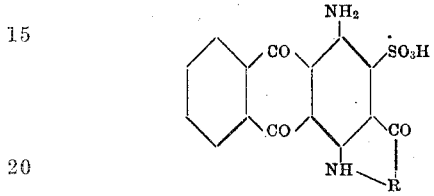

(where R represents an aromatic residue), including derivatives of these compounds.

I can produce my new 4-amino-3-sulfo-2.1-anthraquinone acridones by treating 4-amino-1-arylido-anthraquinone-3-sulfo-2'-carboxylic acid, or derivatives thereof, with a condensing agent under mild conditions so that the sulfonic group in position 3 remains unattacked.

My new compounds consist when dry of dark-green to blue powders, yield green-blue solutions in water and from red-brown to yellow solutions in concentrated sulfuric acid, and are insoluble in most organic solvents. They are capable of dyeing wool from blue to green shades. The sulfonic acid group in position 3 can be split off by heating my new compounds in the presence of organic, or inorganic, agents, such, for instance, as nitrobenzene, trichlorbenzene, phenol, concentrated sulfuric acid, and weakly fuming sulfuric acid, or by treatment with cold, or warm, moderately diluted sulfuric acid, or with alkaline hydrosulfite solution, and if the dye previously contained no other sulfonic group than that in position 3, the splitting off of this sulfonic acid group gives rise to a coloring matter which is no longer capable of dyeing wool, but which can be used for dyeing cotton from an alkaline hydrosulfite vat. In this application I do not claim the splitting off of the sulfonic acid group from position 3 of my new compounds, since this reaction is claimed in my further application for patent, Serial No. 869,167, of even date.

The following examples will serve to illustrate further the nature of this invention, which, however, is not confined to these examples. The parts are by weight:

Example 1: Introduce ten parts of the potassium salt of 4-amino-1-para-chlor-orthocarboxy-anilido-anthraquinone-3-sulfonic acid (obtainable by condensing 4-amino-1-brom-anthraquinone-3-sulfonic acid with potassium-para-chlor-anthranilate) into one hundred parts of twenty-three per cent. fuming sulfuric acid at a temperature of from 20° to 25° C. Stir for from three, to four, hours at this temperature, pour onto ice and filter off the amino-chlor-anthraquinone acridone sulfonic acid, which probably possesses a constitution corresponding to the formula:—

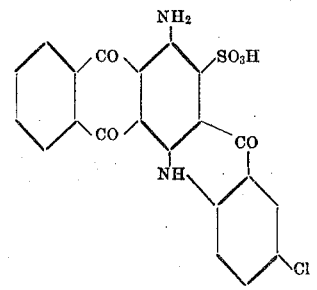

and wash it well with a dilute solution of potassium chlorid. The new coloring matter is, when dry, a dark blue-green powder, it is insoluble in most organic solvents, but is somewhat soluble in water and in alcohol, the solution being greenish blue, and in concentrated sulfuric acid the solution being from yellow to brown. From an acid bath it dyes wool green shades of good fastness.

Example 2: Dissolve ten parts of 4-amino-1-ortho-carboxy-anilido-anthraquinone-3-sulfonic acid in one hundred parts of chlorsulfonic acid, heat for half an hour at from 50° to 60° C., add some dilute sulfuric acid and work up in the manner described in the foregoing Example 1. The new coloring matter consists of a dark green powder which yields a green-blue solution in water and a brown-yellow solution in concentrated sulfuric acid, and it yields somewhat more bluish shades on wool than does the product of the foregoing Example 1.

Now what I claim is:—

1. The new anthraquinone dyes which are 4-amino-3-sulfo-2.1-anthraquinone acridones and which consist when dry of dark green to blue powders, are soluble in water giving green-blue solutions, are soluble in concentrated sulfuric acid giving red-brown to yellow solutions, are insoluble in most organic solvents and dye wool blue to green shades.

2. The new anthraquinone dyes which are 4-amino-3-sulfo-2.1-anthraquinone acridones, and which contain only one sulfonic acid group in the molecule and which consist when dry of dark green to blue powders, are soluble in water giving green-blue solutions, are soluble in concentrated sulfuric acid giving red-brown to yellow solutions, are insoluble in most organic solvents and dye wool blue to green shades and on treatment with alkaline hydrosulfite solution can be made to split off the sulfonic acid group and give rise to vat coloring matters.

3. The new anthraquinone dyes which are amino-halogen-anthraquinone-acridone sulfonic acids, probably possessing a constitution corresponding to the formula:—

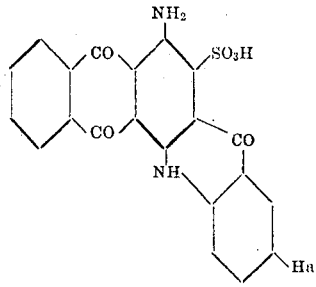

which coloring matters consist when dry of dark blue-green powders, are insoluble in most organic solvents, yield greenish blue solutions in water and brown solutions in concentrated sulfuric acid, dye wool green shades and on treatment with alkaline hydrosulfite solution can be made to split off the sulfonic acid group giving vat dyes which dye cotton blue shades.

4. The process of producing 4-amino-3-sulfo-2.1-anthraquinone acridones by treating 4-amino-1-arylido-anthraquinone-3-sulfo-2'-carboxylic acids with a condensing agent under mild conditions so that the sulfonic group in position 3 remains unattacked.

5. The process of producing an amino-chlor-anthraquinone-acridone-sulfonic acid by treating 4-amino-1-para-chlor-ortho-carboxy-anilido-anthraquinone-3-sulfonic acid with a condensing agent under mild conditions so that the sulfonic group in position 3 remains unattacked.

In testimony whereof I have hereunto set my hand in the presence of two subscribing witnesses.

HEINRICH NERESHEIMER.

Witnesses:
H. MERLE COCHRAN,
N. ERNST.